(No Model.)
F. M. SHAFFER & J. & S. T. SALADA.
DRAFT EQUALIZER.
No. 467,865. Patented Jan. 26, 1892.
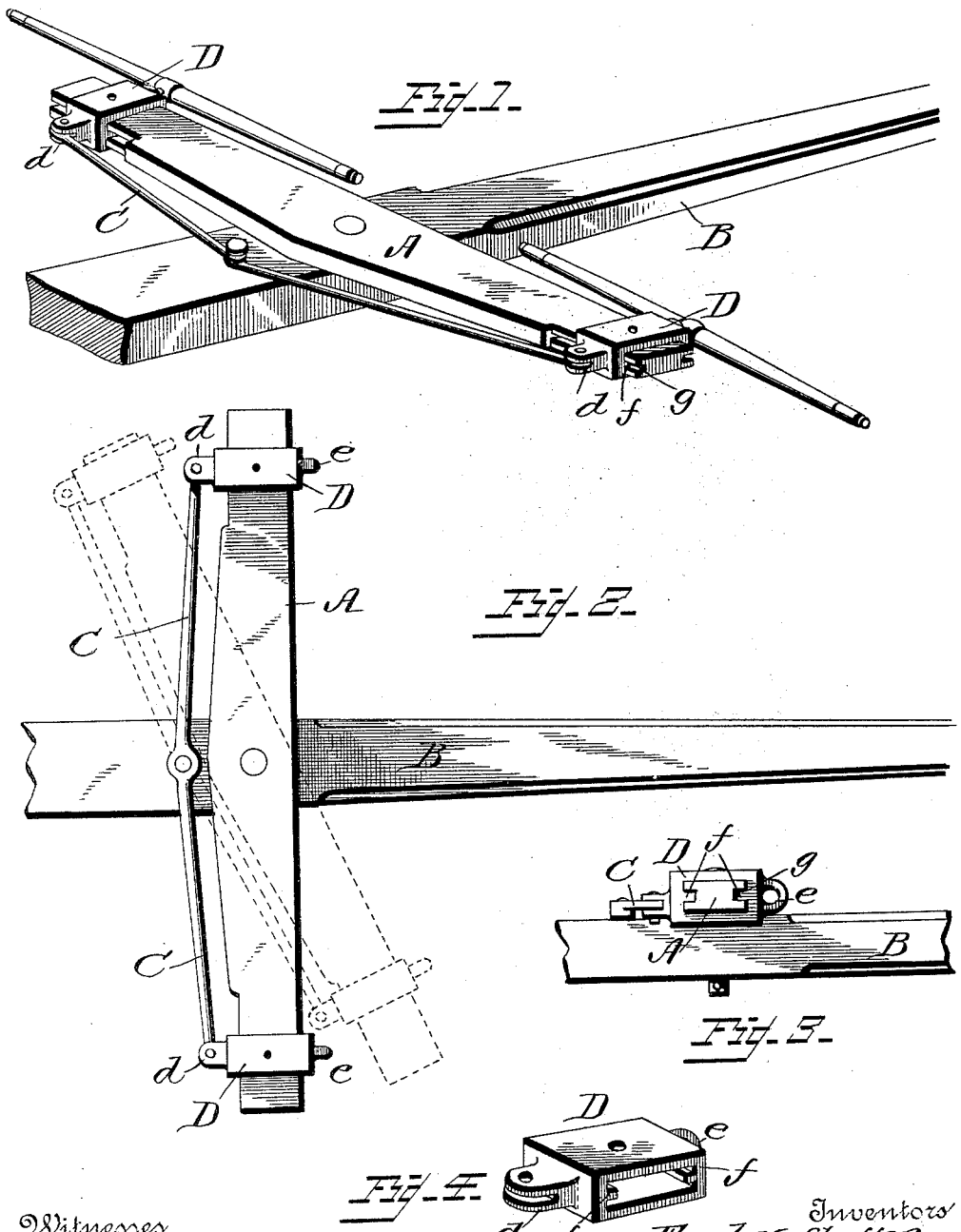
Witnesses
Albert Speiden.
Van Buren Hillyard.
Inventors
Fred M. Shaffer.
Joseph Salada.
Samuel T. Salada.
By their Attorneys
R. S. & A. P. Lacey

UNITED STATES PATENT OFFICE.

FRED M. SHAFFER, JOSEPH SALADA, AND SAMUEL T. SALADA, OF DU BOIS, PENNSYLVANIA.

DRAFT-EQUALIZER.

SPECIFICATION forming part of Letters Patent No. 467,865, dated January 26, 1892.

Application filed August 31, 1891. Serial No. 404,319. (No model.)

*To all whom it may concern:*

Be it known that we, FRED M. SHAFFER, JOSEPH SALADA, and SAMUEL T. SALADA, citizens of the United States, residing at Du Bois, in the county of Clearfield and State of Pennsylvania, have invented certain new and useful Improvements in Draft-Equalizers; and we do hereby declare the following to be a full, clear, and exact description of the invention, such as will enable others skilled in the art to which it appertains to make and use the same.

This invention relates to doubletrees.

The object of the invention is to obviate the use of what is known as the "stay-chain" or "strap" and ease the draft on the lagging horse and proportionately increase the load on the advance horse. The doubletree is pivotally connected with the pole in the usual manner and is equipped near each end with a clip, to which the draft is applied, appliances being provided to positively shift the position of the said clips to change the efficient leverage of the same to compensate for any material difference in strength between the animals or an extra effort on the part of the one to pull ahead, thereby automatically increasing the load on the stronger or the go-ahead animal of the two and proportionately lessening the burden of the weaker or the lagging animal.

The improvement consists of the novel features and the peculiar construction and combination of the parts, which will be hereinafter more fully described and claimed, and which are shown in the annexed drawings, in which—

Figure 1 is a perspective view of a pole and doubletree embodying the invention. Fig. 2 is a top plan view showing the operation of the invention by dotted lines. Fig. 3 is an end view of the doubletree and clip. Fig. 4 is a detail view of one of the clips.

The doubletree A is pivotally connected midway of its ends with the pole or tongue B in any well-known manner, and is provided at each end with clip D, which is constructed to slide on the said doubletree. The lever C, approximately parallel with the doubletree and pivoted to the pole midway of its ends, is connected at its ends with the said clips, preferably by pins, which pass through eyes at the ends of the said lever and through lugs $d$, that project from the rear of the said clips. The clips are constructed to embrace the ends of the doubletree and have draft-loops $e$ on their front sides, to which the animals are hitched. The tongues $f$, projected in from the opposite sides of the clips, work in corresponding grooves $g$ in the edges of the doubletree and prevent binding of the said clips on the doubletree in the efficient operation of the invention. Under normal conditions the clips stand equidistant from the pivotal connection of the doubletree with the pole. In the event of one horse pulling ahead the doubletree will turn on its pivot and cause the lever C to turn also, with the result that the clevis on the advance end of the doubletree will be brought nearer the pole, thereby decreasing the efficient leverage, and the clevis on the receding end will be carried away farther from the pole, thereby increasing the leverage of the lagging horse and giving him a chance to recover himself or pull against the other horse with the advantage of an increased leverage, thereby equalizing the draft between the two animals.

It will be understood that, instead of lever C, links having their ends pivotally connected with the clips and with the pole will answer equally well, and such equivalent devices are contemplated within the meaning of the term "lever," as in effect the result is the same.

Having thus described our invention, what we claim, and desire to secure by Letters Patent, is—

1. The combination, with a pole and a doubletree pivotally connected between its ends with the said pole, of clips on the ends of the doubletree and the mutually-interlocking tongue-and-groove guides between the said clips and the doubletree, and a lever pivotally attached to the pole at a distance from the pivotal connection of the doubletree therewith and secured at its outer ends to the said clips, whereby a turning of the said doubletree on its pivot will cause the clips to shift along on the doubletree, substantially as and for the purpose described.

2. The combination, with a pole and a doubletree pivotally connected between its ends with the said pole, of clips on the ends of the doubletree and the mutually-interlocking tongue-and-groove guides between the said clips and the doubletree, said clips having integrally formed therewith the rear lugs $d$ and the front loops $e$, and an independent connection pivotally attached to the pole at a distance from the pivotal connection of the doubletree therewith and pivotally secured at its outer ends to the rear lugs $d$, whereby a turning of the said doubletree on its pivot will cause the clips to shift along on the doubletree, substantially as and for the purpose described.

In testimony whereof we affix our signatures in presence of two witnesses.

FRED M. SHAFFER.
    JOSEPH SALADA.
    SAMUEL T. SALADA.

Witnesses:
 W. C. PENTZ,
 S. W. HEPLER.